(12) United States Patent
Ballinger et al.

(10) Patent No.: US 8,535,629 B2
(45) Date of Patent: Sep. 17, 2013

(54) ZEOLITE CATALYST CONTAINING METAL

(75) Inventors: Todd Howard Ballinger, Downingtown, PA (US); Philip Gerald Blakeman, Cambridge (GB); Guy Richard Chandler, Cambridge (GB); Hai-Ying Chen, Conshohocken, PA (US); Julian Peter Cox, Malvern, PA (US); Joseph M. Fedeyko, Glen Mills, PA (US); Alexander Nicholas Michael Green, Baldock (GB); Paul Richard Phillips, Royston (GB); Stuart David Reid, Cambourne (GB); Erich C. Weigert, Newtown Square, PA (US); James Alexander Wylie, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 13/310,216

(22) Filed: Dec. 2, 2011

(65) Prior Publication Data

US 2012/0201731 A1 Aug. 9, 2012

Related U.S. Application Data

(60) Provisional application No. 61/419,015, filed on Dec. 2, 2010, provisional application No. 61/565,774, filed on Dec. 1, 2011.

(51) Int. Cl.
*B01D 53/94* (2006.01)
*B01D 53/56* (2006.01)
*B01J 29/76* (2006.01)

(52) U.S. Cl.
USPC ............ 423/213.2; 423/239.1; 423/700; 502/60; 502/65; 502/73

(58) Field of Classification Search
USPC ............ 423/213.2, 239.1, 700; 502/60, 502/65, 73
See application file for complete search history.

(56) References Cited

U.S. PATENT DOCUMENTS 5,270,024 A 12/1993 Kasahara et al.
2008/0226545 A1* 9/2008 Bull et al. .............. 423/700

(Continued)

FOREIGN PATENT DOCUMENTS

EP 1 754 527 A2 2/2007
WO WO-2008/106519 A1 9/2008

(Continued)

OTHER PUBLICATIONS

Fickel et al., "Copper Coordination in Cu-SSZ-13 and Cu-SSZ-16 Investigated by Variable-Temperature XRD," *J. Phys. Chem. C*, 2010, vol. 114, pp. 1633-1640.

(Continued)

*Primary Examiner* — Timothy Vanoy
(74) *Attorney, Agent, or Firm* — Jimmie D. Johnson, Jr.

(57) ABSTRACT

Provided is a catalyst comprising (a) a zeolite material having a mean crystal size of at least about 0.5 μm, having a CHA framework that contains silicon and aluminum, and having a silica-to-alumina mole ratio (SAR) of about 10 to about 25; and (b) an extra-framework promoter metal (M) disposed in said zeolite material as free and/or exchanged metal, wherein the extra-framework promoter metal is copper, iron, and mixtures thereof, and is present in a promoter metal-to-aluminum atomic ratio (M:Al) of about 0.10 to about 0.24 based on the framework aluminum; and optionally comprising (c) at least about 1 weight percent of cerium in said zeolite material, based on the total weight of the zeolite, wherein said cerium is present in a form selected from exchanged cerium ions, monomeric ceria, oligomeric ceria, and combinations thereof, provided that said oligomeric ceria has a particle size of less than 5 μm.

18 Claims, 2 Drawing Sheets

(56) References Cited

U.S. PATENT DOCUMENTS

| | | | |
|---|---|---|---|
| 2009/0048095 A1* | 2/2009 | Li et al. | 502/74 |
| 2010/0092362 A1* | 4/2010 | Li et al. | 423/239.2 |
| 2011/0165051 A1* | 7/2011 | Beutel et al. | 423/239.2 |
| 2011/0165052 A1* | 7/2011 | Beutel et al. | 423/239.2 |
| 2011/0251048 A1 | 10/2011 | Ariga et al. | |

FOREIGN PATENT DOCUMENTS

| | | |
|---|---|---|
| WO | WO-2009/141324 A1 | 11/2009 |
| WO | WO-2010/043891 A1 | 4/2010 |
| WO | WO-2010/074040 A1 | 7/2010 |

OTHER PUBLICATIONS

Korhonen et al., "Isolated $Cu^{2+}$ ions: active sites for selective catalytic reduction of NO," *Chem. Commun.*, 2011, vol. 47, pp. 800-802.

International Search Report dated Mar. 19, 2012, from PCT International Application No. PCT/US2011/063079.

* cited by examiner

ZEOLITE CATALYST CONTAINING METAL

CROSS REFERENCE TO RELATED APPLICATIONS

This application claims the priority benefit of U.S. Provisional Application No. 61/419,015, filed Dec. 2, 2010, and U.S. Provisional Application No. 61/565,774, filed Dec. 1, 2011, both of which are incorporated wherein by reference.

BACKGROUND

A.) Field of Use

The present invention relates to catalysts, systems, and methods that are useful for treating an exhaust gas which occurs as a result of combustion of hydrocarbon fuel, and particularly exhaust gas containing nitrogen oxides, such as an exhaust gas produced by diesel engines.

B.) Description of Related Art

The largest portions of most combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of these undesirable components, preferably by a process that, in turn, does not generate other noxious or toxic substances.

One of the most burdensome components to remove from a vehicular exhaust gas is $NO_x$, which includes nitric oxide (NO), nitrogen dioxide ($NO_2$), and nitrous oxide ($N_2O$). The reduction of $NO_x$ to $N_2$ in a lean burn exhaust gas, such as that created by diesel engines, is particularly problematic because the exhaust gas contains enough oxygen to favor oxidative reactions instead of reduction. $NO_x$ can be reduced in a diesel exhaust gas, however, by a process commonly known as Selective Catalytic Reduction (SCR). An SCR process involves the conversion of $NO_x$, in the presence of a catalyst and with the aid of a reducing agent, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

$$2NO + 4NH_3 + 2O_2 \rightarrow 3N_2 + 6H_2O$$

$$2NO_2 + 4NH_3 + O_2 \rightarrow 3N_2 + 6H_2O$$

$$NO + NO_2 + 2NH_3 \rightarrow 2N_2 + 3H_2O$$

Known SCR catalysts include zeolites and other molecular sieves. Molecular sieves are microporous crystalline solids with well-defined structures and generally contain silicon, aluminum and oxygen in their framework and can also contain cations within their pores. A defining feature of a molecular sieve is its crystalline or pseudo-crystalline structure which is formed by molecular tetrahedral cells interconnected in a regular and/or repeating manner to form a framework. Unique molecular sieve frameworks recognized by the International Zeolite Association (IZA) Structure Commission are assigned a three-letter code to designate the framework type. Examples of molecular sieve frameworks that are known SCR catalysts include Framework Type Codes CHA (chabazite), BEA (beta), and MOR (mordenite).

Some molecular sieves have a three-dimensional molecular framework that arises from the orientation of their interconnected cells. The cells of these molecular sieves typically have volumes on the order of a few cubic nanometers and cell openings (also referred to as "pores" or "apertures") on the order of a few angstroms in diameter. The cells can be defined by the ring size of their pores, where, for example, the term "8-ring" refers to a closed loop that is built from 8 tetrahedrally coordinated silicon (or aluminum) atoms and 8 oxygen atoms. In certain zeolites, the cell pores are aligned within the framework to create one or more channels which extend through the framework, thus creating a mechanism to restrict the ingress or passage of different molecular or ionic species through the molecular sieve, based on the relative sizes of the channels and molecular or ionic species. The size and shape of molecular sieves affect their catalytic activity in part because they exert a steric influence on the reactants, controlling the access of reactants and products. For example, small molecules, such as NOx, can typically pass into and out of the cells and/or can diffuse through the channels of a small-pore molecular sieve (i.e., those having framework with a maximum ring size of eight tetrahedral atoms), whereas larger molecules, such as long chain hydrocarbons, cannot. Moreover, partial or total dehydration of a molecular sieve can results in a crystal structure interlaced with channels of molecular dimensions.

Molecular sieves having a small pore framework, i.e., containing a maximum ring size of 8, have been found to be particularly useful in SCR applications. Small pore molecular sieves include those having the following crystalline structure types: CHA, LEV, ERI, and AEI. Specific aluminosilicates and silico-aluminophosphates examples of molecular sieves having the CHA framework include SAPO-34, AlPO-34, and SSZ-13.

Zeolites are aluminosilicate molecular sieves having a crystalline framework of interconnected alumina and silica, in particular, cross-linked alumina and silica via a sharing of oxygen atoms, and thus can be characterized by its silica-to-alumina ratio (SAR). In general, as a zeolite's SAR increases, the zeolite becomes more hydrothermal stability. Since the temperature of an exhaust gas exiting a mobile lean-burn engine, such as a diesel engine, is often 500 to 650° C. or higher and typically contains water vapor, hydrothermal stability is an important consideration in designing an SCR catalyst.

While zeolites per se often have catalytic properties, their SCR catalytic performance may be improved in certain environments by a cationic exchange wherein a portion of ionic species existing on the surface or within the framework is replaced by metal cations, such $Cu^{2+}$. That is, a zeolite's SCR performance can be promoted by loosely holding one or more metal ions to the molecular sieve's framework.

It is also desirable for an SCR catalyst to have high catalytic activity at low operating temperatures. At low operating temperatures, for example below 400° C., a higher metal loading on a molecular sieve results in higher SCR activity. However, the achievable metal loading is often dependent on the quantity of exchange sites in the molecular sieve, which in turn is dependent upon the material's SAR. In general, molecular sieves with low SAR allow for the highest metal loadings, thus leading to a conflict between the need for high catalytic activity and high hydrothermal stability which is achieved by a relatively higher SAR value. Moreover, high copper-loaded catalysts do not perform as well at high temperatures (e.g., >450° C.). For example, loading an aluminosilicate having a CHA framework with large amounts of copper (i.e., copper-to-aluminum atomic ratio of >0.25) can result in significant $NH_3$ oxidation at temperatures over 450° C., resulting in low selectivity to $N_2$. This shortcoming is particularly acute under filter regeneration conditions which involves exposing the catalyst to temperatures above 650° C.

Another important consideration in designing an SCR catalyst for mobile application is the performance consistency of the catalyst. For example, it is desirable for a fresh catalyst to produce a similar level of NOx conversion to the same catalyst after it has aged.

Accordingly, there remains a need for SCR catalysts that offer improved performance over existing SCR materials.

SUMMARY OF THE INVENTION

Applicants have discovered that certain zeolites having a chabazite (CHA) crystal structure can be loaded with relatively low amounts of promoter metal, such as copper, to provide good conversion at high temperatures, while still retaining good selectivity to NO. More particularly, the present invention utilizes and/or embodies the surprising discovery that certain large crystal zeolites having a CHA framework and a relatively low SAR can be loaded with relatively low amounts of catalytically active metals and still provide good $NO_x$ conversion over a broad temperature range while improving selectivity for $N_2$ at high temperatures (e.g., >about 450° C.). The synergistic effect between one or more of crystal size, copper exchange level, and SAR was heretofore unknown and unexpected.

Applicants have also discovered that high concentrations of cerium can be incorporated into such metal promoted zeolites to improve the material's hydrothermal stability, low temperature catalytic performance, and/or consistency in catalytic performance between the fresh and aged states of the catalyst. For example, certain embodiments of the invention utilize the surprising discovery that the addition of high concentrations of Ce to a fully formulated copper-promoted, low SAR CHA zeolite improves the catalyst's hydrothermal durability compared to similar metal-promoted, low SAR aluminosilicates without Ce. Also surprising is the fact that this improved performance is not observed when Ce is added to similar metal promoted zeolites having a higher SAR or higher promoter metal concentration.

Accordingly, an aspect of the present invention provides a catalyst composition comprising (a) a zeolite material having a CHA framework that contains silicon and aluminum and having a silica-to-alumina mole ratio (SAR) of about 10 to about 25, and preferably a mean crystal size of at least about 0.5 µm; and (b) an extra-framework promoter metal (M) disposed in said zeolite material as free and/or exchanged metal, wherein the extra-framework promoter metal is selected from the group consisting of copper, iron, and mixtures thereof, and is present in a promoter metal-to-aluminum atomic ratio (M:Al) of about 0.10 to about 0.24 based on the framework aluminum. In certain embodiments, such catalyst further comprises at least about 1 weight percent Ce, based on the total weight of the zeolite.

In another aspect of the invention, provided is a catalytically active washcoat comprising (a) a metal promoted zeolite material having a CHA framework that contains silicon and aluminum and having a silica-to-alumina mole ratio (SAR) of about 10 to about 25 and preferably having a mean crystal size of at least about 0.5 µm; wherein the zeolite is promoted with an extra-framework promoter metal (M) selected from the group consisting of copper, iron, and mixtures thereof, and wherein the extra-framework promoter metal is present in a promoter metal-to-aluminum atomic ratio (M:Al) of about 0.10 to about 0.24 based on the framework aluminum; and (b) one or more stabilizers and/or binders, wherein the metal promoted zeolite and the one or more stabilizers and/or binders are present together in a slurry.

In yet another aspect of the invention, provided is a method for reducing $NO_x$ in an exhaust gas comprising (a) contacting an exhaust gas derived from a lean-burn combustion process and containing $NO_x$ with a catalyst composition comprising (i) a zeolite material having a CHA framework that contains silicon and aluminum and having a silica-to-alumina mole ratio (SAR) of about 10 to about 25 and preferably having a mean crystal size of at least about 0.5 µm; and (ii) an extra-framework promoter metal (M) disposed in said zeolite material as free and/or exchanged metal, wherein the extra-framework promoter metal is selected from the group consisting of copper, iron, and mixtures thereof, and is present in a promoter metal-to-aluminum atomic ratio (M:Al) of about 0.10 to about 0.24 based on the framework aluminum; and (b) converting at a portion of said $NO_x$ to $N_2$ and $H_2O$.

DETAILED DESCRIPTION OF PREFERRED EMBODIMENTS OF THE INVENTION

Figure 1:
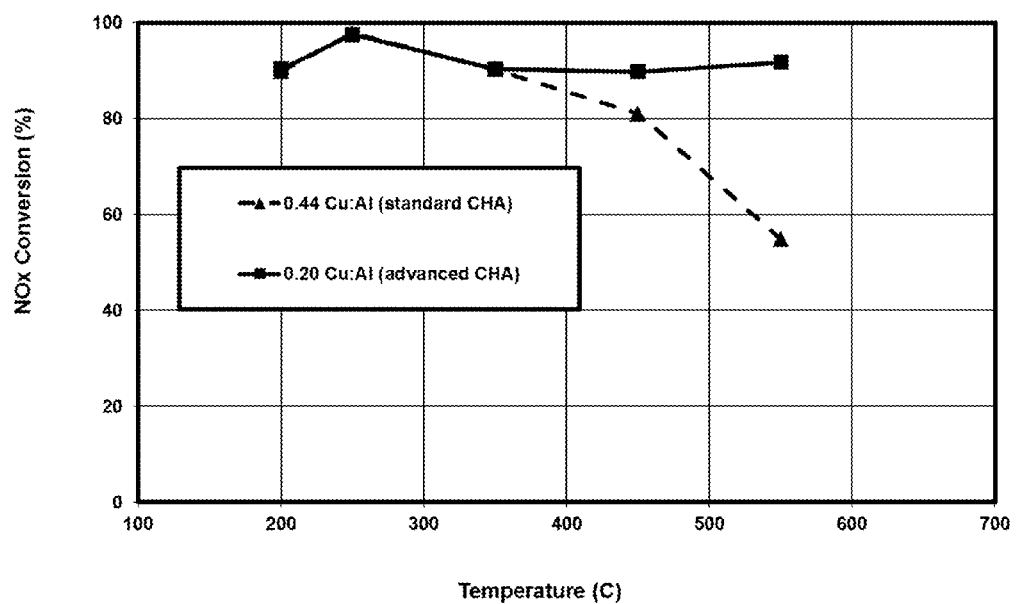
FIG. 1 is a graphical depiction of data regarding $NO_x$ conversion capacity of (1) a Cu-SSZ-13 catalyst having low copper loading according to an embodiment of the invention and (2) a comparative material having high copper loading.

In a preferred embodiment, the invention is directed to a catalyst for improving environmental air quality, particularly for improving exhaust gas emissions generated by diesel and other lean burn engines. Exhaust gas emissions are improved, at least in part, by reducing $NO_x$ and/or $NH_3$ slip concentrations lean burn exhaust gas over a broad operational temperature range. Useful catalysts are those that selectively reduce $NO_x$ and/or oxidize ammonia in an oxidative environment (i.e., an SCR catalyst and/or AMOX catalyst).

According to a preferred embodiment, provided is a catalyst composition comprising a zeolite material having a CHA framework and a silica-to-alumina mole ratio (SAR) of about 10 to about 25, and preferably having a mean crystalline size of about 0.5 to about 5 microns; and containing at least one a non-aluminum promoter metal (M) present in said zeolite material in a promoter metal to aluminum ratio (M:Al) of about 0.10 to about 0.24.

Zeolites of the present invention are aluminosilicates having a crystalline or pseudo crystalline structure and may include framework metals other than aluminum (i.e., metal-substituted), but do not include silico-aluminophosphates (SAPOs). As used herein, the term "metal substituted" with respect to a zeolite means a framework having one or more aluminum or silicon framework atoms replaced by a substituting metal. In contrast, the term "metal exchanged" means a zeolite having extra-framework metal ions. Examples of metals suitable as substituting metals include copper and iron.

Suitable zeolites have a CHA crystalline structure. The distinction between zeolite type materials, such as naturally occurring (i.e. mineral) chabazite, and isotypes within the same Framework Type Code is not merely arbitrary, but reflects differences in the properties between the materials, which may in turn lead to differences in activity in the method of the present invention. Zeolites for use in the present application include natural and synthetic zeolites, but are preferably synthetic zeolites because these zeolites have more uniform SAR, crystallite size, and crystallite morphology, and have fewer and less concentrated impurities (e.g. alkaline earth metals). Specific zeolites having the CHA structure that are useful in the present invention include, but are not limited to, SSZ-13, LZ-218, Linde D, Linde R, Phi, and ZK-14, with SSZ-13 being preferred.

Preferred zeolites having a CHA crystal structure do not have an appreciable amount of phosphorous in their framework. That is, the zeolite CHA frameworks of the present invention do not have phosphorous as a regular repeating unit and/or do not have an amount of phosphorous that would affect the basic physical and/or chemical properties of the material, particularly with respect to the material's capacity to selectively reduce $NO_x$ over a broad temperature range. Accordingly, non-phosphorous CHA crystal structure may include crystalline structures having a de minimus amount of phosphorous.

Zeolites with application in the present invention can include those that have been treated to improve hydrothermal stability. Conventional methods of improving hydrothermal stability include: (i) dealumination by steaming and acid extraction using an acid or complexing agent e.g. (EDTA—ethylenediaminetetracetic acid); treatment with acid and/or complexing agent; treatment with a gaseous stream of $SiCl_4$ (replaces Al in the zeolite framework with Si); and (ii) cation exchange—use of multi-valent cations such as lanthanum (La). Other methods, such as the use of phosphorous containing compounds, are not necessary due to the synergistic effect of combining low copper loading on a CHA zeolite having relatively low SAR and relative large mean crystal size.

In preferred embodiments, the catalyst composition comprises molecular sieve crystals having a mean crystal size of greater than about 0.5 preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. The crystals in the catalyst composition can be individual crystals, agglomeration of crystals, or a combination of both, provided that agglomeration of crystals have a mean particle size that is preferably less than about 15 µm, more preferably less than about 10 µm, and even more preferably less than about 5 µm. The lower limit on the mean particle size of the agglomeration is the composition's mean individual crystal size.

Crystal size (also referred to herein as the crystal diameter) is the length of one edge of a face of the crystal. For example, the morphology of chabazite crystals is characterized by rhombohedral (but approximately cubic) faces wherein each edge of the face is approximately the same length. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of a straight edge are measured and recorded. (Particles that are clearly large polycrystalline aggregates should not be included the measurements.) Based on these measurements, the arithmetic mean of the sample crystal sizes is calculated.

Particle size of an agglomeration of crystals can be determined in a similar manner except that instead of measuring the edge of a face of an individual crystal, the length of the longest side of an agglomeration is measured. Other techniques for determining mean particle size, such as laser diffraction and scattering can also be used.

As used herein, the term "mean" with respect to crystal or particle size is intended to represent the arithmetic mean of a statistically significant sample of the population. For example, a catalyst comprising molecular sieve crystals having a mean crystal size of about 0.5 to about 5.0 µm is catalyst having a population of the molecular sieve crystals, wherein a statistically significant sample of the population (e.g., 50 crystals) would produce an arithmetic mean within the range of about 0.5 to about 5.0 µm.

In addition to the mean crystal size, catalyst compositions preferably have a majority of the crystal sizes are greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. Preferably, the first and third quartile of the sample of crystals sizes is greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. As used herein, the term "first quartile" means the value below which one quarter of the elements are located. For example, the first quartile of a sample of forty crystal sizes is the size of the tenth crystal when the forty crystal sizes are arranged in order from smallest to largest. Similarly, the term "third quartile" means that value below which three quarters of the elements are located.

Preferred CHA zeolites have a mole ratio of silica-to-alumina about 10 to about 25, more preferably from about 14 to about 18, and even more preferably from about 15 to about 17. The silica-to-alumina ratio of zeolites may be determined by conventional analysis. This ratio is meant to represent, as closely as possible, the ratio in the rigid atomic framework of the zeolite crystal and to exclude silicon or aluminum in the binder or, in cationic or other form, within the channels. It will be appreciated that it may be extremely difficult to directly measure the silica-to-alumina ratio of zeolite after it has been combined with a binder material. Accordingly, the silica-to-alumina ratio has been expressed hereinabove in term of the silica-to-alumina ratio of the parent zeolite, i.e., the zeolite used to prepare the catalyst, as measured prior to the combination of this zeolite with the other catalyst components.

CHA zeolites, particular SSZ-13, having a low SAR and large mean crystal size are commercially available. Alternatively, these materials can be synthesized by known processes in the art, such as those described in WO 2010/043981 (which is incorporated herein by reference) and WO 2010/074040 (which is incorporated herein by reference), or D. W. Fickel, et al., "Copper Coordination in Cu-SSZ-13 and Cu-SSZ-16 Investigated by Variable-Temperature XRD", *J Phys. Chem.*, 114, p. 1633-40 (2010), which demonstrates the synthesis of a copper-loaded SSZ-13 having an SAR of 12.

Preferably, the catalyst composition comprises at least one extra-framework metal to improve (i.e., promote) the catalytic performance and/or thermal stability of the material. As used herein, an "extra-framework metal" is one that resides within the molecular sieve and/or on at least a portion of the molecular sieve surface, does not include aluminum, and does not include atoms constituting the framework of the molecular sieve. The extra-framework metal can be added to the molecular sieve via any known technique such as ion exchange, impregnation, isomorphous substitution, etc. Extra-framework metals may be of any of the recognized catalytically active metals that are used in the catalyst industry to form metal-exchanged molecular sieves. In one embodiment, at least one extra-framework metal is used in conjunction with the molecular sieve to increase the catalyst's performance. Preferred extra-framework metals are selected from the group consisting of copper, nickel, zinc, iron, tin, tungsten, molybdenum, cobalt, bismuth, titanium, zirconium, antimony, manganese, chromium, vanadium, niobium, ruthenium, rhodium, palladium, gold, silver, indium, platinum, iridium, rhenium, and mixtures thereof. More preferred extra-framework metals include those selected from the group consisting of chromium, manganese, iron, cobalt, nickel, and copper, and mixtures thereof. Preferably, at least one of the extra-framework metals is copper. Other preferred extra-framework metals include iron, particularly in combination with copper. For embodiments in which the aluminosilicate has a CHA framework, the preferred promoter is copper.

In certain embodiments, the promoter metal loading is about 0.1 to about 10 wt % based on the total weight of the molecular sieve, for example from about 0.5 wt % to about 5 wt %, from about 0.5 to about 1 wt %, and from about 2 to about 5 wt %. In certain embodiments, the promoter metal (M), preferably copper, is present in the aluminosilicate zeolite in an amount to produce a M:Al atomic ratio of about 0.17 to about 0.24, preferably about 0.22 to about 0.24, particularly when the aluminosilicate zeolite has an SAR of about 15 to about 20. As used herein, the M:Al ratio is based on the relative amount of M to framework Al in the corresponding zeolite. In certain embodiments that included exchanged copper, the copper is present in an amount from about 80 to about 120 g/ft$^3$ of zeolite or washcoat loading, including for example about 86 to about 94 g/ft$^3$, or about 92 to about 94 g/ft$^3$.

The type and concentration of the transmission metal can vary according to the host molecular sieve and the application.

In one example, a metal-exchanged molecular sieve is created by blending the molecular sieve into a solution containing soluble precursors of the catalytically active metal. The pH of the solution may be adjusted to induce precipitation of the catalytically active cations onto or within the molecular sieve structure. For example, in a preferred embodiment a chabazite is immersed in a solution containing copper nitrate for a time sufficient to allow incorporation of the catalytically active copper cations into the molecular sieve structure by ion exchange. Un-exchanged copper ions are precipitated out. Depending on the application, a portion of the un-exchanged ions can remain in the molecular sieve material as free copper. The metal-exchanged molecular sieve may then be washed, dried and calcined. When iron and/or copper is used as the metal cation, the metal content of the catalytic material by weight preferably comprises from about 0.1 to about 10 percent by weight, more preferably from about 0.5 to about 10 percent by weight, for example about 1 to about 5 percent by weight or about 2 to about 3 percent by weight, based on the weight of the zeolite.

In another embodiment of the invention, the amount of promoter metal, such as copper, in the catalyst is not particularly limited provided that the catalyst can achieve a NO$_x$ conversion of at least about 65%, preferably at least about 75%, and more preferably at least about 85%, at a temperature of at least about 450° C., more preferably a temperature of at least about 550° C., and even more preferably a temperature of at least about 650° C. Preferably, the conversion at each of these temperature ranges is at least about 70%, more preferably 80%, and even more preferably 90% of the conversion capacity of the catalyst when the catalyst is operating at a temperature of 250° C. Preferably, the catalyst can achieve 80% conversion with a selectivity for N$_2$ of at least about 85% at one or more of these temperature ranges.

Generally, ion exchange of the catalytic metal cation into or on the molecular sieve may be carried out at room temperature or at a temperature up to about 80° C. over a period of about 1 to 24 hours at a pH of about 7. The resulting catalytic molecular sieve material is preferably dried at about 100 to 120° overnight and calcined at a temperature of at least about 500° C.

In certain embodiments, the metal promoted zeolite catalysts of the present invention also contain a relatively large amount of Ce. In certain embodiments, the zeolite, preferably a CHA aluminosilicate, has an SAR of less than 20, preferably about 15 to about 18, and is promoted with a metal, preferably copper and preferably in a copper:aluminum atomic ratio of about 0.17 to about 0.24, and also contains Ce in a concentration of greater than about 1 weight percent, preferably greater than about 1.35 weight percent, more preferably 1.35 to 13.5 weight percent, based on the total weight of the zeolite. Such Ce-containing catalysts are more durable compared to structurally similar catalysts, such as other CHA zeolites having a higher SAR, particularly those with higher loadings of promoter metals.

Preferably, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite. For most of these ranges, the improvement in catalyst performance correlates directly to the concentration of Ce in the catalyst. These ranges are particularly preferred for copper promoted aluminosilicates having a CHA framework, such as SSZ-13, with an SAR of about 10 to about 25, about 20 to about 25, about 15 to about 20, or about 16 to about 18, and more preferably for such embodiments, wherein the copper is present in a copper-to-aluminum ratio of about 0.17 to about 0.24.

In certain embodiments, the cerium concentration in the catalyst material is about 50 to about 550 g/ft$^3$. Other ranges of Ce include: above 100 g/ft$^3$, above 200 g/ft$^3$, above 300 g/ft$^3$, above 400 g/ft$^3$, above 500 g/ft$^3$, from about 75 to about 350 g/ft$^3$, from about 100 to about 300 g/ft$^3$, and from about 100 to about 250 g/ft$^3$.

In certain embodiments, the concentration of Ce exceeds the theoretical maximum amount available for exchange on the metal-promoted zeolite. Accordingly, in some embodiments, Ce is present in more than one form, such as Ce ions, monomeric ceria, oligomeric ceria, and combinations thereof, provided that said oligomeric ceria has a mean crystal size of less than 5 μm, for example less than 1 μm, about 10 nm to about 1 μm, about 100 nm to about 1 μm, about 500 nm to about 1 μm, about 10 to about 500 nm, about 100 to about 500 nm, and about 10 to about 100 nm. As used herein, the term "monomeric ceria" means CeO$_2$ as individual molecules or moieties residing freely on and/or in the zeolite or weakly bonded to the zeolite. As used herein, the term "oligomeric ceria" means nanocrystalline $CeO_2$ residing freely on and/or in the zeolite or weakly bonded to the zeolite.

For embodiments in which the catalyst is part of a washcoat composition, the washcoat may further comprise binder containing Ce or ceria. For such embodiments, the Ce containing particles in the binder are significantly larger than the Ce containing particles in the catalyst.

Cerium is preferably incorporated into a zeolite containing a promoting metal. For example, in a preferred embodiment, an aluminosilicate having a CHA framework undergoes a copper exchange process prior to being impregnated by Ce. An exemplary Ce impregnation process involves adding Ce nitrate to a copper promoted zeolite via a conventional incipient wetness technique.

The zeolite catalyst for use in the present invention can be in the form of a washcoat, preferably a washcoat that is suitable for coating a substrate, such as a metal or ceramic flow through monolith substrate or a filtering substrate, including for example a wall-flow filter or sintered metal or partial filter. Accordingly, another aspect of the invention is a washcoat comprising a catalyst component as described herein. In addition the catalyst component, washcoat compositions can further comprise a binder selected from the group consisting of alumina, silica, (non zeolite) silica-alumina, naturally occurring clays, $TiO_2$, $ZrO_2$, and $SnO_2$.

In one embodiment, provided is a substrate upon which the zeolite catalyst is deposited.

Preferred substrates for use in mobile application are monoliths having a so-called honeycomb geometry which comprises a plurality of adjacent, parallel channels, each channel typically having a square cross-sectional area. The honeycomb shape provide a large catalytic surface with minimal overall size and pressure drop. The zeolite catalyst can be deposited on a flow-through monolith substrate (e.g., a honeycomb monolithic catalyst support structure with many small, parallel channels running axially through the entire part) or filter monolith substrate such as a wall-flow filter, etc. In another embodiment, the zeolite catalyst is formed into an extruded-type catalyst. Preferably, the zeolite catalyst is coated on a substrate in an amount sufficient to reduce the NOx contained in an exhaust gas stream flowing through the substrate. In certain embodiments, at least a portion of the substrate may also contain a platinum group metal, such as platinum (Pt), to oxidize ammonia in the exhaust gas stream.

Preferably, the molecular sieve catalyst is embodied in or on a substrate in an amount sufficient to reduce the $NO_x$ contained in an exhaust gas stream flowing through the substrate. In certain embodiments, at least a portion of the substrate may also contain an oxidation catalyst, such as a platinum group metal (e.g. platinum), to oxidize ammonia in the exhaust gas stream or perform other functions such as conversion of CO into $CO_2$.

The catalytic zeolites described herein can promote the reaction of a reductant, preferably ammonia, with nitrogen oxides to selectively form elemental nitrogen ($N_2$) and water ($H_2O$) vis-à-vis the competing reaction of oxygen and ammonia. In one embodiment, the catalyst can be formulated to favor the reduction of nitrogen oxides with ammonia (i.e., and SCR catalyst). In another embodiment, the catalyst can be formulated to favor the oxidation of ammonia with oxygen (i.e., an ammonia oxidation (AMOX) catalyst). In yet another embodiment, an SCR catalyst and an AMOX catalyst are used in series, wherein both catalyst comprise the metal containing zeolite described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst or a non-PGM catalyst. Preferably, the AMOX catalyst is disposed on a high surface area support, including but not limited to alumina. In certain embodiments, the AMOX catalyst is applied to a substrate, preferably substrates that are designed to provide large contact surface with minimal backpressure, such as flow-through metallic or cordierite honeycombs. For example, a preferred substrate has between about 25 and about 300 cells per square inch (CPSI) to ensure low backpressure. Achieving low backpressure is particularly important to minimize the AMOX catalyst's effect on the low-pressure EGR performance. The AMOX catalyst can be applied to the substrate as a washcoat, preferably to achieve a loading of about 0.3 to 2.3 $g/in^3$. To provide further $NO_x$ conversion, the front part of the substrate can be coated with just SCR coating, and the rear coated with SCR and an $NH_3$ oxidation catalyst which can further include Pt or Pt/Pd on an alumina support.

According to another aspect of the invention, provided is a method for the reduction of NOx compounds or oxidation of $NH_3$ in a gas, which comprises contacting the gas with a catalyst composition described herein for the catalytic reduction of $NO_x$ compounds for a time sufficient to reduce the level of $NO_x$ compounds in the gas. In one embodiment, nitrogen oxides are reduced with the reducing agent at a temperature of at least 100° C. In another embodiment, nitrogen oxides are reduced with the reducing agent at a temperature from about 150° C. to 750° C. In a particular embodiment, the temperature range is from 175 to 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter. In other embodiments, the zeolite SCR catalyst is incorporated on a filter substrate. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the NOx concentration in the exhaust gas; and (f) contacting the exhaust gas with an AMOX catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

The reductant (also known as a reducing agent) for SCR processes broadly means any compound that promotes the reduction of NOx in an exhaust gas. Examples of reductants useful in the present invention include ammonia, hydrazine or any suitable ammonia precursor, such as urea (($NH_2)_2CO$), ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred.

In another embodiment, all or at least a portion of the nitrogen-based reductant, particularly $NH_3$, can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, a zeolite catalyst described herein. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable NOx sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$. The control means can comprise a pre-programmed processor such as an electronic control unit (ECU).

In a further embodiment, an oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is uncatalyzed, the means for metering nitrogenous reductant can be located between the oxidation catalyst and the filter.

In a further embodiment, the zeolite catalyst for use in the present invention is coated on a filter located downstream of the oxidation catalyst. Where the filter includes the zeolite catalyst for use in the present invention, the point of metering the nitrogenous reductant is preferably located between the oxidation catalyst and the filter.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

EXAMPLES

Example 1

A zeolite sample was prepared having CHA framework (isotype SSZ-13) and an SAR of about 17. The sample was loaded with copper to produce a catalyst material having a Cu:Al atomic ration of about 0.20. Following aging at about 550° C. for about 72 hours, the catalyst was exposed to a simulated diesel engine exhaust gas that was combined with ammonia to produce a stream having an ammonia to $NO_x$ ratio (ANR) of 1 and a space velocity of 50,000 per hour. The catalyst's capacity for $NO_x$ conversion was determined at temperatures ranging from 200 PC to 550° C.

Comparative Example 1

For comparison, a similar SSZ-13 zeolite was prepared, but instead of being loaded with a low amount of copper, the comparative material was loaded with enough copper to yield a Cu:Al atomic ratio>0.44. The comparative material was exposed to a similar exhaust gas stream under similar conditions. The comparative material's capacity for $NO_x$ conversion was determined at temperatures ranging from 200° C. to 550° C.

It was found that at temperatures above 350° C., the low loaded catalyst shows significant improvements in $NO_x$ conversion.

Example 2

Figure 2:
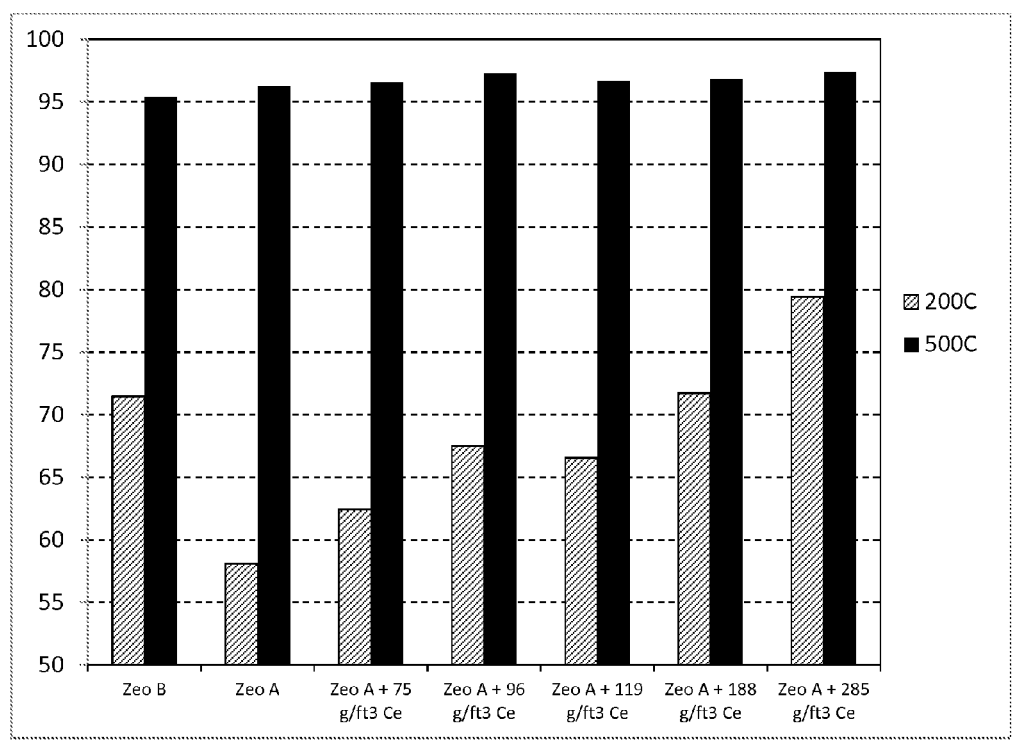
FIG. 2 is a bar graph showing data on $NO_x$ conversion of various catalysts of the invention that contain Ce and also comparative examples of other catalyst materials.

An aluminosilicate having a CHA framework (isotype SSZ-13) having an SAR of 17 (zeolite A) and containing 2.4 weight percent of exchanged copper (based on total weight of zeolite) was impregnated with Ce nitrate using an incipient wetness technique and then washcoated on a substrate to produce a catalyst sample having 75 g/ft³ of Ce (1.35 weight percent Ce, based on total zeolite weight). The same technique was repeated to produced catalyst samples having the 96 g/ft³ of Ce, 119 g/ft³ of Ce, 188 g/ft³ of Ce, and 285 g/ft³ of Ce. Each of these samples was hydrothermally aged at 800° C. in 10% $H_2O$ for five hours. These samples were then analyzed to determine their capacity for NOx conversion in an $NH_3$ SCR process at 200° C. and at 500° C., wherein the $NH_3$ SCR process is tuned to allow 20 ppm ammonia slip. The results of this analysis are provided in FIG. 2.

Comparative Examples 2 & 3

Zeolite A, without Ce impregnation, was analyzed to determine its capacity for NOx conversion in an $NH_3$ SCR process at 200° C. and at 500° C., wherein the $NH_3$ SCR process is tuned to allow 20 ppm ammonia slip. The results of this analysis are provided in FIG. 1.

An aluminosilicate having a CHA framework (isotype SSZ-13) having an SAR of 25 and containing 3.3 weight percent of exchanged copper (without Ce impregnation) was analyzed to determine its capacity for NOx conversion in an $NH_3$ SCR process at 200° C. and at 500° C., wherein the $NH_3$ SCR process is tuned to allow 20 ppm ammonia slip. The results of this analysis are provided in FIG. 2.

The results of these tests demonstrate that low SAR, copper-promoted zeolites that are impregnated with Ce have superior hydrothermal durability.

What is claimed is:

1. A catalyst composition comprising:
   a. a zeolite material having a mean crystal size of at least about 0.5 μm, having a CHA framework that contains silicon and aluminum, and having a silica-to-alumina mole ratio (SAR) of about 10 to about 25; and
   b. an extra-framework promoter metal (M) disposed in said zeolite material as free and/or exchanged metal, wherein the extra-framework promoter metal is selected from the group consisting of copper, iron, and mixtures thereof, and is present in a promoter metal-to-aluminum atomic ratio (M:Al) of about 0.10 to about 0.24 based on the framework aluminum.

2. The catalyst composition of claim 1, wherein said zeolite has an SAR of about 14 to about 18.

3. The catalyst composition of claim 1, wherein said zeolite is an SSZ-13 isotype.

4. The catalyst composition of claim 3, wherein said zeolite has a mean crystal size of about 1 μm to about 5 μm.

5. The catalyst composition of claim 1, wherein said promoter metal is copper.

6. The catalyst composition of claim 5, wherein a majority of said copper is exchanged copper.

7. The catalyst composition of claim 6, wherein the catalyst has an M:A ratio of about 0.17 to about 0.24.

8. The catalyst composition of claim 6, wherein the catalyst has an M:A ratio of about 0.22 to about 0.24.

9. The catalyst composition of claim 6, wherein the catalyst contains about 2 to about 3 weight percent of said copper.

10. The catalyst composition of claim 4, wherein the zeolite has an SAR of about 16 to about 18, the promoter metal is copper, a majority of the copper is exchanged copper, and the copper is present in an M:A ratio of about 0.22 to about 0.24.

11. The catalyst composition of claim 1, further comprising:
   c. at least about 1 weight percent of cerium in said zeolite material, based on the total weight of the zeolite, wherein said cerium is present in a form selected from exchanged cerium ions, monomeric ceria, oligomeric ceria, and combinations thereof, provided that said oligomeric ceria has a particle size of less than 5 μm.

12. The catalyst composition of claim 11, wherein the catalyst composition comprises about 1.35 to about 13.5 weight percent of cerium, based on the total weight of the zeolite.

13. The catalyst composition of claim 12, wherein said composition is substantially free of Zr, ZrO, Ti, and TiO.

14. A catalytically active washcoat comprising:
   a. a metal promoted zeolite material having a CHA framework containing silicon and aluminum and having a silica-to-alumina mole ratio (SAR) of about 10 to about 25; wherein the zeolite is promoted with an extra-framework promoter metal (M) selected from the group consisting of copper, iron, and mixtures thereof, and wherein the extra-framework promoter metal is present in a promoter metal-to-aluminum atomic ratio (M:Al) of about 0.10 to about 0.24 based on the framework aluminum; and
   b. one or more stabilizers and/or binders,
wherein the metal promoted zeolite and the one or more stabilizers and/or binders are present together in a slurry.

15. A method for reducing $NO_x$ in an exhaust gas comprising:
   contacting an exhaust gas derived from a lean-burn combustion process and containing $NO_x$ with a catalyst composition comprising:
      i. a zeolite material having a CHA framework containing silicon and aluminum and having a silica-to-alumina mole ratio (SAR) of about 10 to about 25; and
      ii. an extra-framework promoter metal (M) disposed in said zeolite material as free and/or exchanged metal, wherein the extra-framework promoter metal is selected from the group consisting of copper, iron, and mixtures thereof, and is present in a promoter metal-to-aluminum atomic ratio (M:Al) of about 0.10 to about 0.24 based on the framework aluminum; and
   converting at a portion of said $NO_x$ to $N_2$ and $H_2O$.

16. The catalytically active washcoat of claim 14 further comprising at least about 1 weight percent of cerium in said zeolite material, based on the total weight of the zeolite, wherein said cerium is present in a form selected from exchanged cerium ions, monomeric ceria, oligomeric ceria, and combinations thereof, provided that said oligomeric ceria has a particle size of less than 5 μm.

17. The catalytically active washcoat of claim 16 comprising the binder, wherein the binder is selected from the group consisting of ceria, alumina, silica, (non zeolite) silica-alumina, naturally occurring clays, $TiO_2$, $ZrO_2$, and $SnO_2$.

18. The method for reducing $NO_x$ of claim 15, wherein the catalyst composition further comprises: iii. at least about 1 weight percent of cerium in said zeolite material, based on the total weight of the zeolite, wherein said cerium is present in a form selected from exchanged cerium ions, monomeric ceria, oligomeric ceria, and combinations thereof, provided that said oligomeric ceria has a particle size of less than 5 μm.

* * * * *